United States Patent
Diab et al.

(10) Patent No.: US 8,243,726 B2
(45) Date of Patent: *Aug. 14, 2012

(54) SYSTEM AND METHOD FOR ENABLING OPERATION OF AN ETHERNET DEVICE OVER AN EXTENDED DISTANCE

(75) Inventors: Wael William Diab, San Francisco, CA (US); Alireza Abaye, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 11/866,624

(22) Filed: Oct. 3, 2007

(65) Prior Publication Data

US 2008/0285546 A1   Nov. 20, 2008

Related U.S. Application Data

(60) Provisional application No. 60/917,769, filed on May 14, 2007.

(51) Int. Cl.
*H04L 12/66* (2006.01)
(52) U.S. Cl. .................... 370/356; 710/62; 710/105
(58) Field of Classification Search .................. None
See application file for complete search history.

(56) References Cited

U.S. PATENT DOCUMENTS

| | | | |
|---|---|---|---|
| 6,438,384 B1 | 8/2002 | Chen | |
| 2001/0019559 A1 | 9/2001 | Handler et al. | |
| 2002/0048283 A1 | 4/2002 | Lin | |
| 2003/0206542 A1 * | 11/2003 | Holder | 370/338 |
| 2004/0136712 A1 | 7/2004 | Stiscia et al. | |
| 2004/0174979 A1 | 9/2004 | Hutton et al. | |
| 2004/0208151 A1 | 10/2004 | Haverinen et al. | |
| 2004/0218748 A1 | 11/2004 | Fisher | |
| 2004/0259541 A1 | 12/2004 | Hicks et al. | |
| 2005/0027888 A1 | 2/2005 | Juszkiewicz | |
| 2005/0047497 A1 | 3/2005 | Rubinstain et al. | |
| 2007/0060133 A1 | 3/2007 | Spitzer et al. | |
| 2008/0144821 A1 * | 6/2008 | Armstrong | 380/216 |
| 2008/0235763 A1 | 9/2008 | Krantz et al. | |
| 2008/0240089 A1 | 10/2008 | Jiang et al. | |
| 2008/0285545 A1 | 11/2008 | Diab et al. | |
| 2008/0285546 A1 | 11/2008 | Diab et al. | |
| 2010/0241748 A1 | 9/2010 | Ansari et al. | |

OTHER PUBLICATIONS

Newton, Harry. Newton's Telcom Dictionary. 19 ed. San Francisco: CMP, 2003.*
Home Netowrk Pro—WAN Information. Apr. 9, 2005. Retreived from Archive.org on Oct. 4, 2011. http://www.homenetworkpro.com/wan.htm.*
Broadcom BCM54880 Product Brief, Octal 10/100/1000BASE-T Gigabit Ethernet BroadR-ReachTM Transceiver.

* cited by examiner

*Primary Examiner* — Melanie Jagannathan
*Assistant Examiner* — Justin N Mullen
(74) *Attorney, Agent, or Firm* — Duane S. Kobayashi

(57) ABSTRACT

A system and method for enabling operation of an Ethernet device over an extended distance. In a multiple dwelling unit (MDU) a customer premises equipment (CPE) can be coupled to a network unit via a broad reach Ethernet link that is greater than 100 meters (e.g., 500 meters). In this example, a CPE having a conventional Ethernet port can be operated over the broad reach Ethernet link using a converter device.

15 Claims, 5 Drawing Sheets

SYSTEM AND METHOD FOR ENABLING OPERATION OF AN ETHERNET DEVICE OVER AN EXTENDED DISTANCE

This application claims priority to provisional application No. 60/917,769, filed May 14, 2007, which is incorporated by reference herein, in its entirety, for all purposes.

BACKGROUND

1. Field of the Invention

The present invention relates generally to Ethernet communication and, more particularly, to a system and method for enabling operation of an Ethernet device over an extended distance.

2. Introduction

Incumbent local exchange carriers (ILEC) and competitive local exchange carriers (CLECS) are seeking to capitalize on the growing market for broadband Internet connections to the home. One example of an ILEC Internet service is a digital subscriber line (DSL) service, which provides a broadband connection over a conventional copper twisted pair. Recent ILEC offerings have enhanced the bandwidth of connections to the home using fiber optic technology. Hybrid solutions also exist where fiber optic solutions are combined with copper twisted pairs from a curbside or other remote terminal. These ILEC offerings are seeking to compete with cable providers that provide broadband connections using their existing coaxial cable TV infrastructure.

Regardless of the method of connection to the customer, the connections terminate on customer premise equipment (CPE). Examples of CPEs include a DSL or cable modem. In general, the CPE is responsible for performing media conversion, switching, security, provisioning, etc.

One of the major markets of competition for ILEC and CLECS are multiple dwelling units (MDUs) such as apartment complexes, office buildings, high-rise complexes, etc. This MDU market has vast potential due to the density of the customer base. In servicing such a market, it is important that the delivery of services to CPEs in individual customer premises be accomplished in a cost-effective manner. What is needed therefore is a service transport mechanism such as Ethernet that increases the cost effectiveness of a service provider in meeting the particular needs of the MDU market.

SUMMARY

A system and/or method for enabling operation of an Ethernet device over an extended distance, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
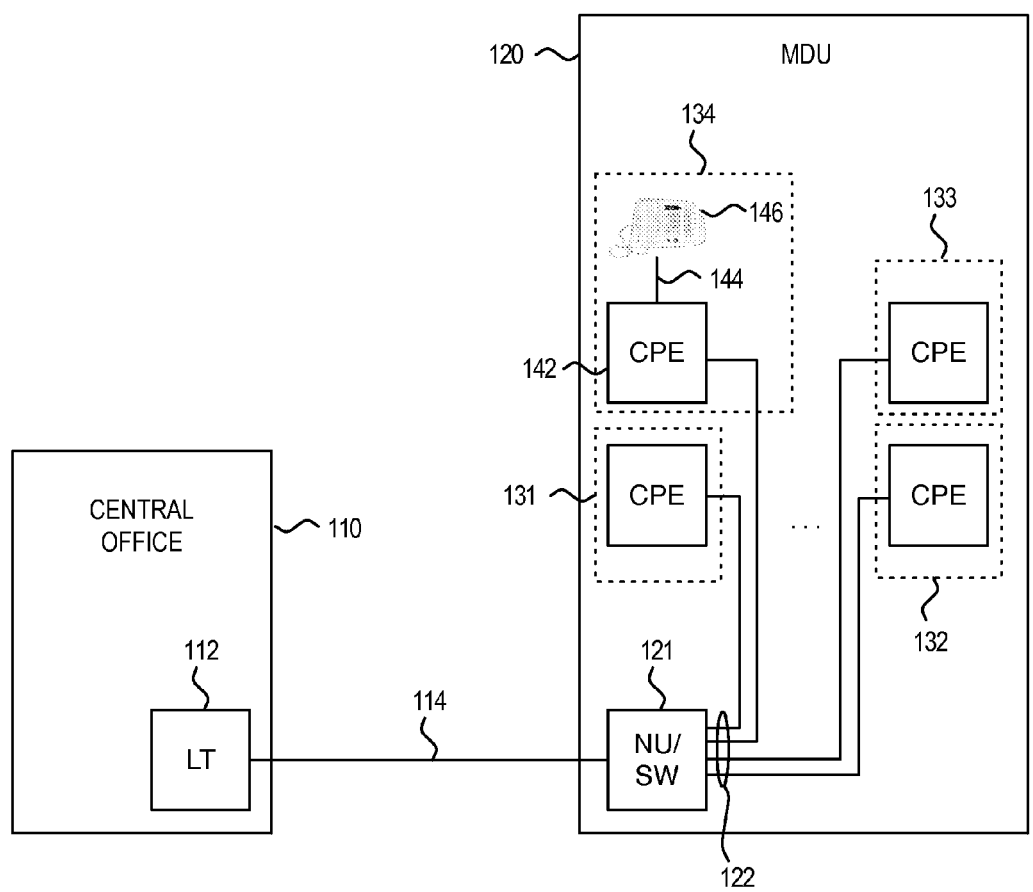
FIG. 1 illustrates an example of a system that services a MDU complex.

Unlike suburban residential markets, the MDU market can benefit greatly from economies of scale. FIG. 1 illustrates an example system architecture for provisioning service to multiple customer premises in an MDU. In this illustrated example, the MDU service is supported by central office 110 (or other hub location). Although not shown, central office 110 is itself connected with other central offices and hubs through a broader communications network. In one embodiment, central office 110 is connected to MDU 120 via a high bandwidth connection between line terminal (LT) 112 in central office 110 and network unit (NU) 121 in MDU 120. In one scenario, NU 121 is located in a basement of MDU 120. In various implementations, link 114 can be embodied as a copper link, fiber optic link, etc. Moreover, in one embodiment, LT 112 is positioned as a remote terminal in a location that is remote from central office 110.

NU 121 in MDU 120 can be configured to perform a media conversion. For example, NU 121 can perform a media conversion from fiber optic cabling to copper cabling. In the illustrated example, NU 121 can support multiple CPEs in MDU 120 via a plurality of links 122. In a typical high-rise building, the plurality of links can extend from the basement to customer premises 131-134 on various floors in MDU 120.

In one configuration, the connection between NU 121 and individual CPEs is via a copper connection. In various embodiments, this copper connection can be based on standard Ethernet, DSL, or the like. In various implementations, the copper DSL connection can be Ethernet (e.g., 2BASE-TL and 10PASS-TS) or non-Ethernet based.

As illustrated, NU 121 also incorporates switching functionality that aggregates a plurality of links into a single uplink. NU 121 can also effect various network policies. For example, NU 121 can enforce various bandwidth limitations in accordance with service provisioning under a particular service level agreement (SLA).

In general, a CPE can be configured to perform media conversion, switching, security, provisioning, etc. As such, a CPE such as a DSL modem can be used to support multiple devices within a single customer premises. For example, a DSL modem can support such devices as a VOIP phone, a computer, a wireless access point, a television, etc. As illustrated in FIG. 1, NU 121 can have a DSL connection to CPE 142 in customer premises 134. CPE 142 in turn supports various customer devices. As illustrated, CPE 142 supports VOIP phone 146 via Ethernet connection 144.

One of the disadvantages of the provisioning example of FIG. 1 is the expense of supporting the various links from NU 121 to each customer premises 131-134. In a typical MDU, these links can extend well over 100 meters, thus creating a need for CPE components such as DSL modems. CPEs represent the most significant component of the expense in supporting the links from NU 121 to customer premises 131-134.

Figure 2:
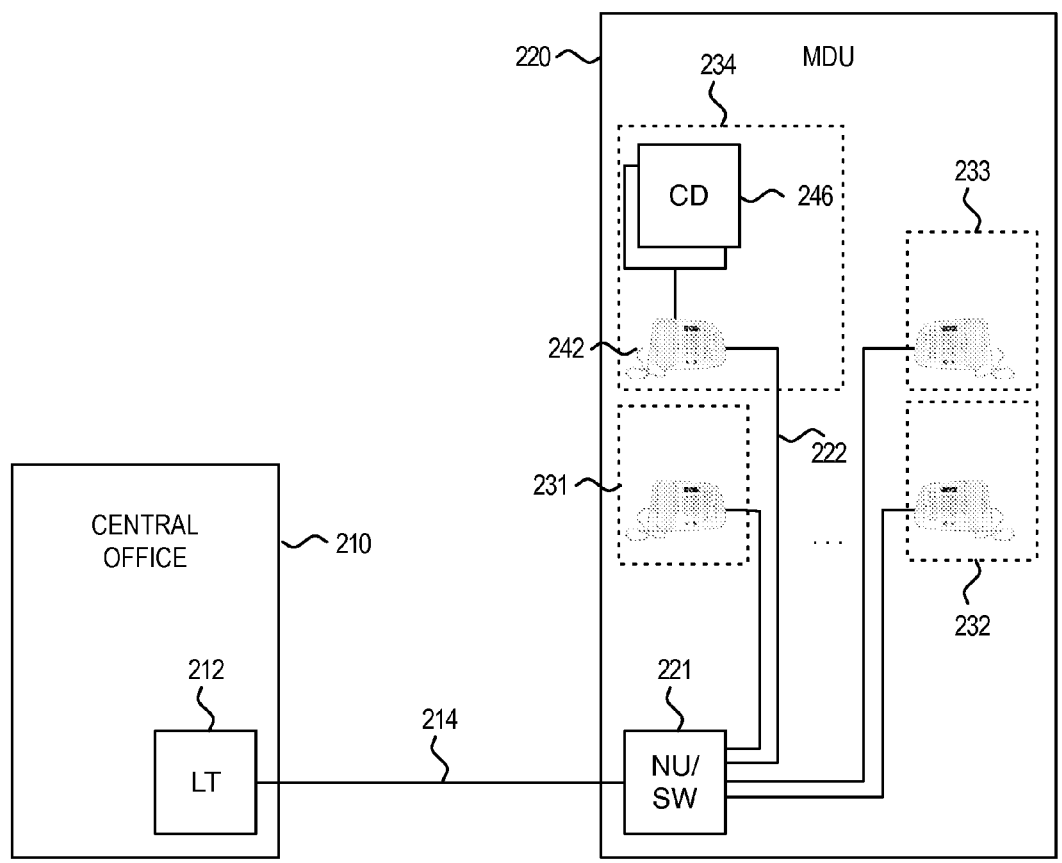
FIG. 2 illustrates an embodiment of a system that services a MDU complex.

FIG. 2 illustrates a system architecture that enables a reduction of such costs. In the illustrated example, a high-bandwidth connection such as fiber-optic link 214 is supported by LT 212 in central office 210 and NU 221 in MDU 220. Unlike the previous system architecture, links from NU 221 to customer premises 231-234 are not supported by conventional CPEs. Rather, the conventional CPE such as a DSL modem is eliminated from the system architecture. Instead, the links from NU 221 to customer premises 231-234 can be based on an Ethernet CPE device such as VOIP phone 242 in customer premises 234.

In this arrangement, a VOIP phone can be configured to function as a VOIP CPE. As illustrated in FIG. 2, VOIP CPE 242 can therefore be used to support multiple customer devices (CDs) 246 in customer premises 234. Examples of such CDs are personal computers, wireless access points, televisions, HD receivers, etc. These CDs can be coupled to VOIP CPE 242 via a separate link (e.g., Ethernet).

In the system architecture of FIG. 2, each VOIP CPE can be coupled to NU 221 via a wall socket that supports an Ethernet-type connection. As noted, one example of MDU 220 is a high-rise building. As would be appreciated, a link from NU 221 to a customer premises near the top of the high-rise building would require a link length that is far greater than 100 meters. Conventional Ethernet connections only support link spans up to 100 meters. Accordingly, conventional Ethernet connections cannot be used to support the lengthy link spans from NU 221 to customer premises 231-234.

For this reason, the connection between NU 221 and a customer premises can be based on a broad reach Ethernet connection that can handle link spans as long as 500 meters and beyond. An example of such a broad reach Ethernet transceiver is Broadcom's BroadR-Reach™ transceivers.

The broad reach connection enables frames to be carried natively in Ethernet. This is advantageous because NU 221 can be based on a conventional enterprise switch box not a DSL box, and a frame format conversion such as that performed by a DSL modem at the CPE would not be required. Moreover, the switch chips inside NU 221 are standard devices that can enjoy high volume efficiencies. In general, broad reach Ethernet extends the physical transmission capabilities of Ethernet but preserves the PCS, RS, MAC and above as native Ethernet. Broad reach Ethernet is also backwards compatible with standard Ethernet.

In general, the VOIP CPE can be built with functionality similar to personal computers. For example, a VOIP CPE can have a central processing unit (CPU), a switch, router, and software/firmware that can define its configuration and functionality. In one embodiment, the VOIP CPE is embedded with CPE functionality such as encryption, authentication, provisioning, packet inspection, router, network address translation, USB support, prioritization, audio/video bridging, etc. This embedded functionality would enable the VOIP CPE to operate in a capacity similar to a conventional CPE.

Figure 3:
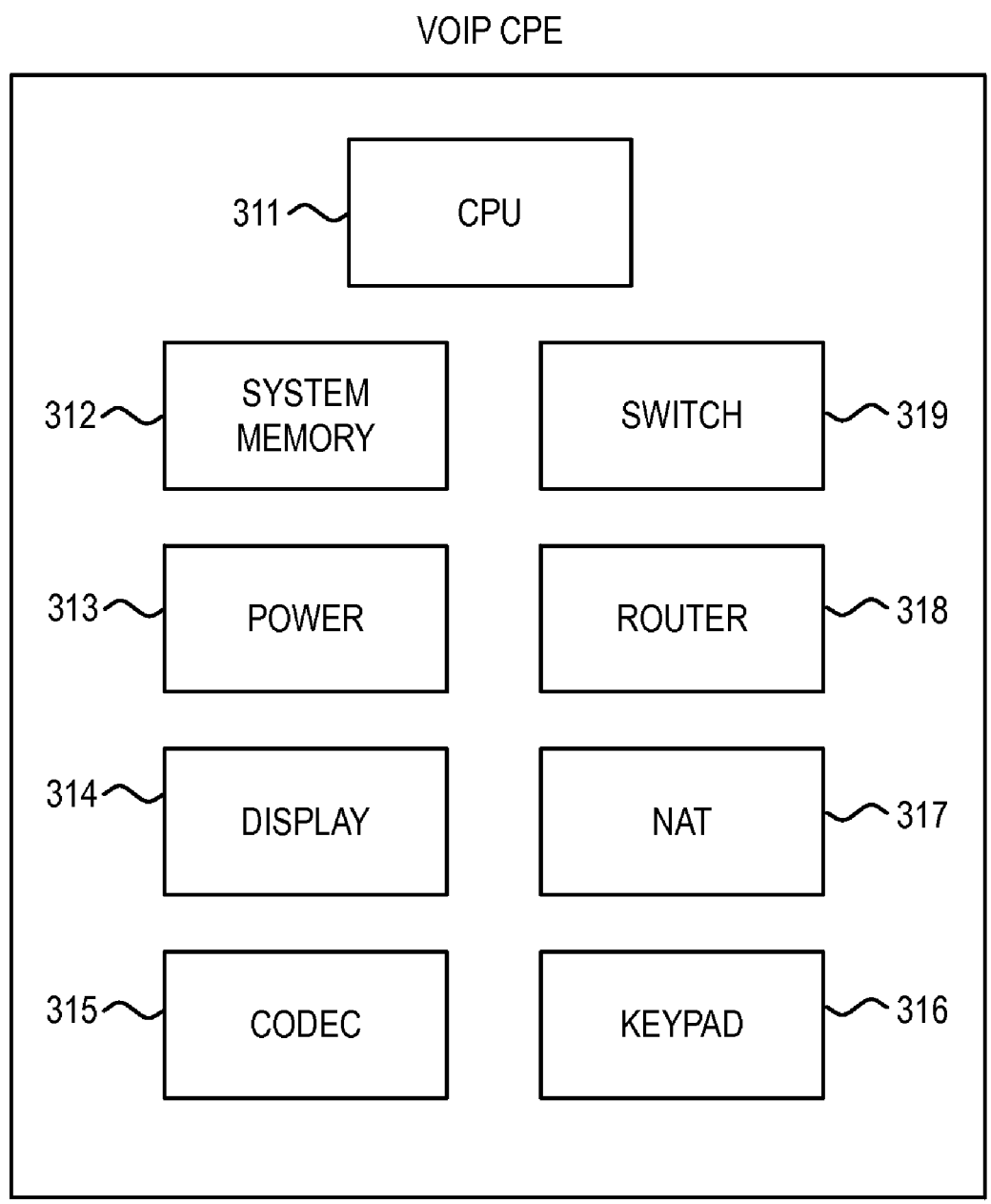
FIG. 3 illustrates an embodiment of a VOIP CPE.

FIG. 3 illustrates an example of a VOIP CPE. As would be appreciated, various bus/bridge architectures (e.g., north/south bridge architectures) can be used to connect the various components in the system. As illustrated, VOIP CPE can include conventional components such as CPU 311, system memory 312, and power 313. As the VOIP CPE can be embodied as a VOIP phone, support for VOIP traffic is also included. Here, the VOIP CPE would include display 314, codec 315, and keypad 316. Display 314 can be embodied as an LCD screen for dialing and other call control/notification functions. Codec 315 supports the conversion of an audio signal from/to a digital bitstream in the downstream/upstream directions. As such, codec 315 can be coupled to an amplifier that supports a speaker and microphone for VOIP communication. Finally, keypad 316 enables the user input of dialing instructions. In combination, display 314, codec 315, and keypad 316 would support the VOIP function of the VOIP CPE.

Figure 4:
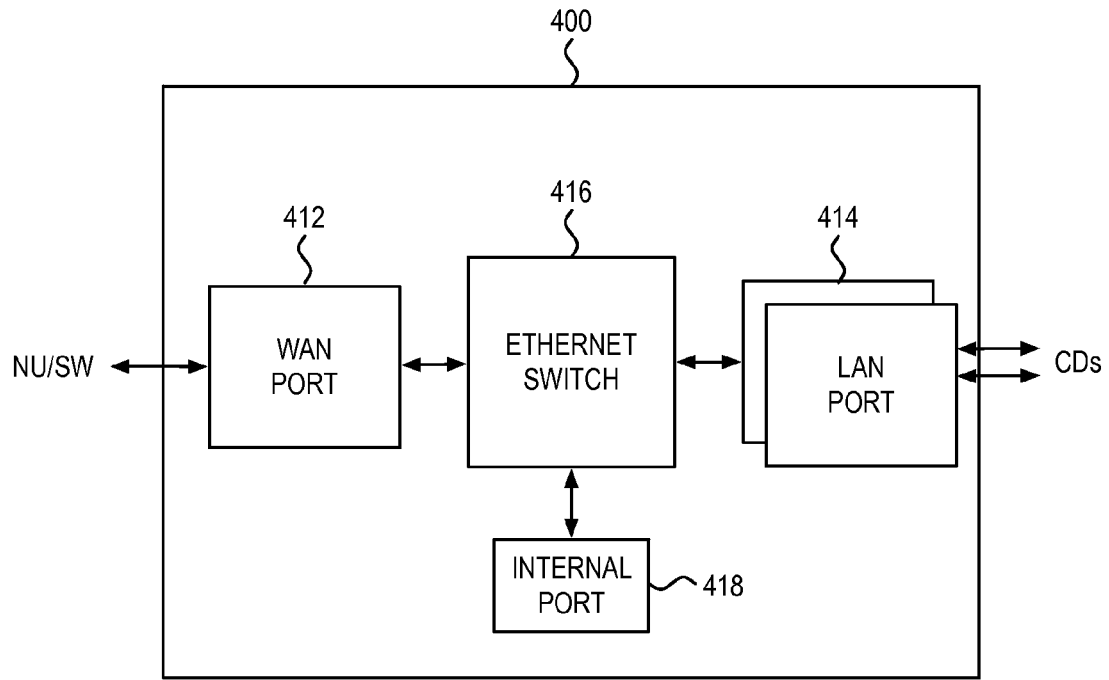
FIG. 4 illustrates CPE functionality in a VOIP device.

As noted, a VOIP CPE can support multiple CDs such as wireless access points, televisions, computers, HD receivers, etc. In FIG. 3, this support is enabled by switch 319, router 318, and network address translation (NAT) 317 functionality. In combination, switch 319, router 318, and NAT 317 enable the VOIP device to operate as a CPE for one or more CDs. FIG. 4 illustrates an example of such CPE functionality. As illustrated, VOIP CPE 400 includes WAN port 412 for connection to an NU/SW, one or more LAN ports 414 for connection to one or more CDs, and internal port 418. In one embodiment, WAN port 412 and LAN ports 414 are Ethernet ports. In general, WAN port 412, LAN port(s) 414 and internal port 418 support full duplex links such that traffic can be coming from either direction at the same time. Traffic can also be switched to two ports simultaneously. For example, internal port 418 can add traffic to WAN port 412 (e.g., VOIP traffic) and LAN port(s) 414, or receive traffic from either or both of WAN port 412 and LAN port(s) 414. WAN port 412, LAN port(s) 414, and internal port 418 are coupled together via switch 416. In routing traffic from WAN port 412 to LAN port(s) 414, VOIP CPE 400 would support a CPE switching functionality for the customer premises.

VOIP CPE can be designed to support some form of authentication, privacy and security. Authentication would indicate to the network that the VOIP CPE is a valid network device that can receive communication. By validating exactly what services (e.g., IPTV, VOIP, data, etc.) are allowed to the VOIP CPE, the system can ensure that services are not stolen. Privacy/security can be enabled by encryption (e.g., MACSec), which would ensure that transmitted data (e.g., voice data) cannot be monitored by third parties. In general, authentication, privacy and security can be used to prevent unauthorized devices from accessing the link at other points.

As described above, the VOIP CPE can be designed with a physical layer device (PHY) that supports broad reach Ethernet. In one embodiment, the VOIP CPE is configured with a standard Ethernet PHY. This configuration would be suitable for those applications where links less than 100 meters were used. This configuration can also be used for those applications where links are greater than 100 meters.

Figure 5:
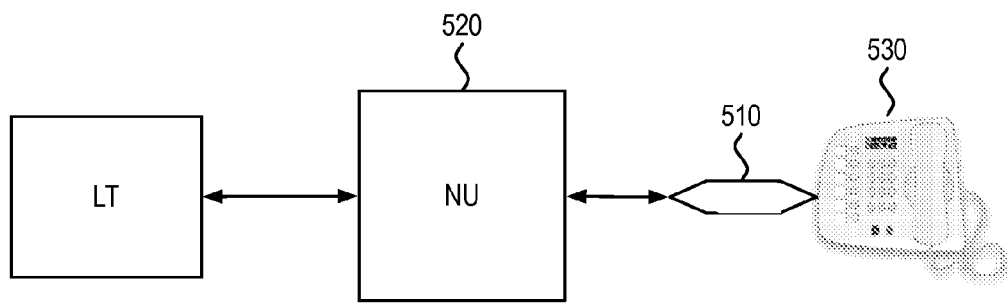
FIG. 5 illustrates a connection of a VOIP CPE using a conversion device.

In accordance with the present invention, a VOIP CPE with a standard Ethernet PHY can be coupled to a broad reach Ethernet connection via a conversion device that converts standard Ethernet to broad reach Ethernet. FIG. 5 illustrates such an embodiment, where VOIP CPE 530 having a standard Ethernet PHY is coupled to NU 520 via conversion device 5 10. Here, NU 520 supports a broad reach Ethernet link that terminates on a broad reach PHY in conversion device 5 10. Conversion device 510 then converts the broad reach Ethernet link to a standard Ethernet link for delivery to VOIP CPE 530. In one embodiment, conversion device 510 is a dongle that is designed for insertion into VOIP CPE 530. In another embodiment, conversion device 510 can be coupled to VOIP CPE 530 via an Ethernet cable.

An advantage of using an Ethernet link (conventional or broad reach) between an NU and CPE is the elimination of reliance on local loop technologies such as DSL. This feature leads to simpler NU and CPE designs that leverage high volume Ethernet components. Specifically, the support of broad reach Ethernet communication by the VOIP CPE either directly or through a conversion device obviates the need for DSL support by both the NU and CPE. This greatly reduces the complexity and cost of the NU.

Figure 6:
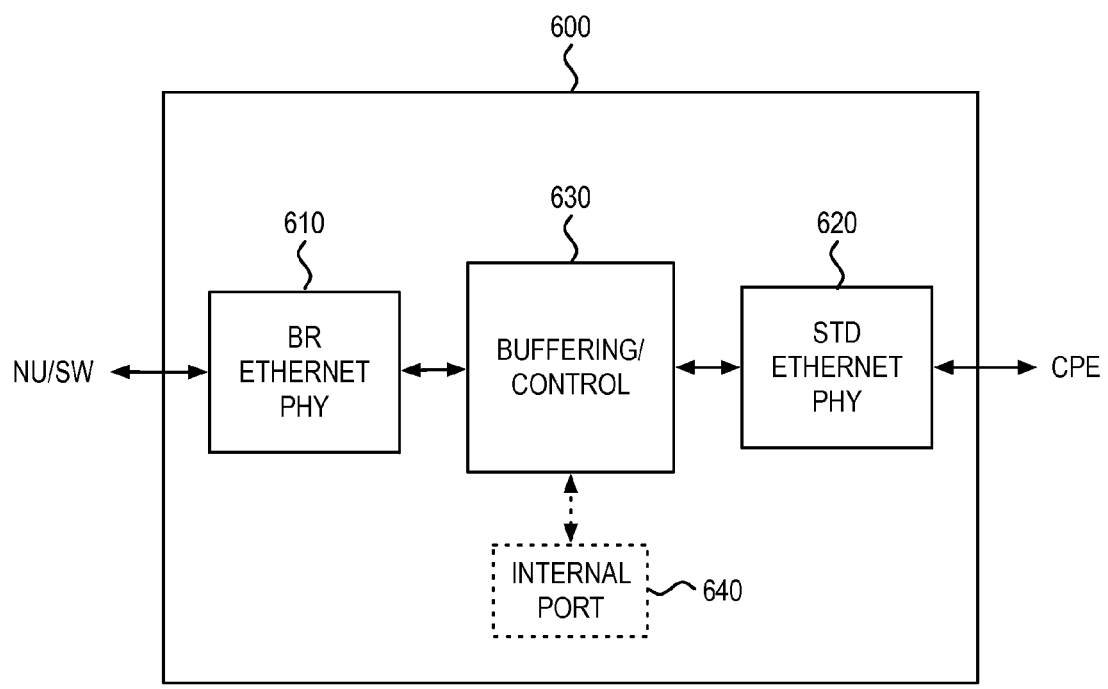
FIG. 6 illustrates an embodiment of a conversion device.

FIG. 6 illustrates an embodiment of a conversion device, which operates as a media converter. As illustrated, conversion device 600 includes broad reach Ethernet PHY 610 and standard Ethernet PHY 620 operating back to back. Here, broad reach Ethernet PHY 610 is coupled to the NU, while standard Ethernet PHY 620 is coupled to the WAN port of the CPE. Conversion device 600 can also include buffering and/or control logic 630 in between broad reach Ethernet PHY 610 and standard Ethernet PHY 620. In one embodiment, conversion device can also include internal port 640 for management purposes.

In one embodiment, the conversion device can be used to abstract the VOIP CPE from knowing the particular type of physical WAN connection. The VOIP CPE can therefore be designed with a standard Ethernet WAN port, while relying on the conversion device to meet the particular application need. Thus, the VOIP CPE having a standard Ethernet WAN port can be coupled to a conversion device that converts standard DSL, Ethernet-based DSL (e.g., 2BASE-TL and 10PASS-TS), etc. to a standard Ethernet connection.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A customer premises equipment system, comprising:
a converter that includes a broad reach Ethernet physical layer device designed to communicate over a copper twisted pair Ethernet cable greater than 100 meters in continuous length and a second Ethernet physical layer device designed to communicate over a second link less than 100 meters; and
a voice over Internet protocol phone device contained in a single housing, said voice over Internet protocol phone device including:
a third Ethernet physical layer device coupled to said second Ethernet physical layer device of said converter;
a handset for voice over Internet protocol communication that is delivered over said copper twisted pair Ethernet cable and said second link; and
a port for connection of a customer device to said voice over Internet protocol phone, wherein customer device communication is delivered over said copper twisted pair Ethernet cable and said second link.

2. The customer premises equipment system of claim 1, wherein said customer device is a wireless access point.

3. The customer premises equipment system of claim 1, wherein said customer device is a television.

4. The customer premises equipment system of claim 1, wherein said customer device is a computer.

5. The customer premises equipment system of claim 1, wherein said customer device is a high definition receiver.

6. The customer premises equipment system of claim 1, wherein said port is an Ethernet port.

7. The system of claim 1, wherein said second link is a cable link.

8. The system of claim 1, wherein said third Ethernet physical layer device is coupled to said converter via said second link.

9. The system of claim 1, wherein said handset is incorporated into a unit that contains said third Ethernet physical layer device and said port.

10. A customer premises equipment system, comprising:
a converter dongle that includes a broad reach Ethernet physical layer device and a second Ethernet physical layer device, said broad reach Ethernet physical layer device being designed to communicate with a network unit over a copper twisted pair Ethernet cable that is greater than 100 meters in continuous length; and
a voice over Internet protocol phone device being contained in a single housing, said voice over Internet protocol phone device including a third Ethernet physical layer device that is designed to communicate with said second Ethernet physical layer device in said converter dongle, said voice over Internet protocol phone device also including an external port for coupling to a customer device, wherein communication to said customer device is delivered over said copper twisted pair Ethernet cable.

11. The customer premises equipment system of claim 10, wherein said customer device is a wireless access point.

12. The customer premises equipment system of claim 10, wherein said customer device is a television.

13. The customer premises equipment system of claim 10, wherein said customer device is a computer.

14. The customer premises equipment system of claim 10, wherein said customer device is a high definition receiver.

15. The customer premises equipment system of claim 10, wherein said port is an Ethernet port.

* * * * *